Oct. 29, 1963

V. J. JENKINS 3,108,629

BODY CLAMP

Filed Sept. 14, 1961

INVENTOR.
*Vance J. Jenkins.*
BY *John Cyril Malloy*

ATTORNEY.

Oct. 29, 1963 V. J. JENKINS 3,108,629
BODY CLAMP
Filed Sept. 14, 1961 2 Sheets-Sheet 2

INVENTOR.
*Vance J. Jenkins.*
BY
*John Cyril Malloy*
ATTORNEY.

3,108,629
Patented Oct. 29, 1963

3,108,629
BODY CLAMP
Vance J. Jenkins, 2340 E. 9th Ave., Hialeah, Fla.
Filed Sept. 14, 1961, Ser. No. 138,127
5 Claims. (Cl. 153—32)

This invention relates to the repair of damaged automobile bodies, and, in particular, to a tool for use in restoring to normal shape automobile bodies which have been damaged.

When an automobile body has been damaged in such a way that to restore it to the normal position it is required that it be stretched along a forward to rearward line or a side to side line, repair is accomplished by holding one side of the body in fixed position relative to which the opposing side of the body is pulled or pushed back into normal relation with the side being held. The side being held ordinarily has a force applied to it through a push bar so that during the application of the force an opposing side may be pulled relative to it. In the past, the push bar has been positioned in abutting engagement with one of the sturdy chassis members which have characterized the underside of the conventional automobile of the past; however, many cars being manufactured currently are of unit body construction; that is, all of the elements which comprise the body are welded together instead of being welded to a sturdy chassis of heavy members. In the unit body construction type automobile there is no place to which the conventional push bar can be positioned and a sufficiently large compressive force applied because the welded together parts will yield to the force at the point of application instead of distributing it along the sides, front or rear of the body as the heavy members do in the sturdy chassis type body.

This invention has as an object the provision of a body clamp which may be applied to an automobile having a unit body construction whereby a beam may be temporarily affixed to said body so that the conventional push bar may be used in the manner previously described in the case of chassis type bodies.

It is another object of this invention to provide a body clamp that may be affixed to damaged automobile bodies of unit welded construction which require stretching along a forward to rearward line or side to side line, so that the body may be repaired with conventional auto repair tools.

It is also an object of the instant invention to provide a device of the type described hereinafter which is strong and durable, relatively simple to manufacture, and otherwise well adapted for the uses and purposes specified.

In accordance with these and other objects which will become apparent hereinafter, the instant invention will now be described with reference to the accompanying drawings illustrating a preferred embodiment thereof.

Figure 1:
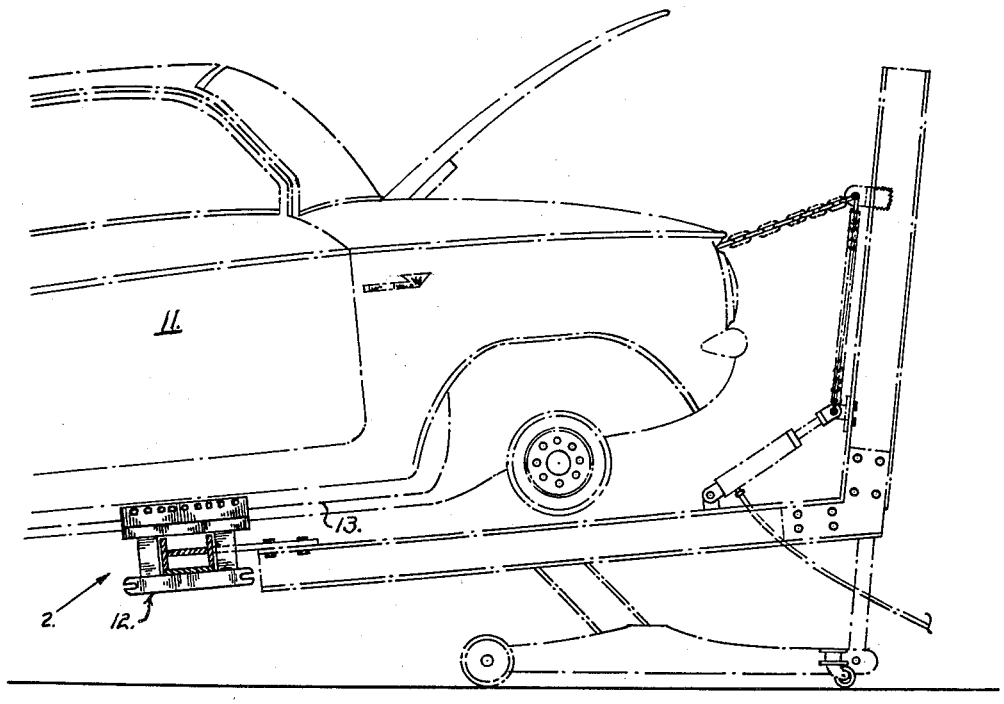
FIG. 1 is a side elevation of an automobile body which is being repaired and which has attached thereto the adaptor of the instant invention.
Figure 2:
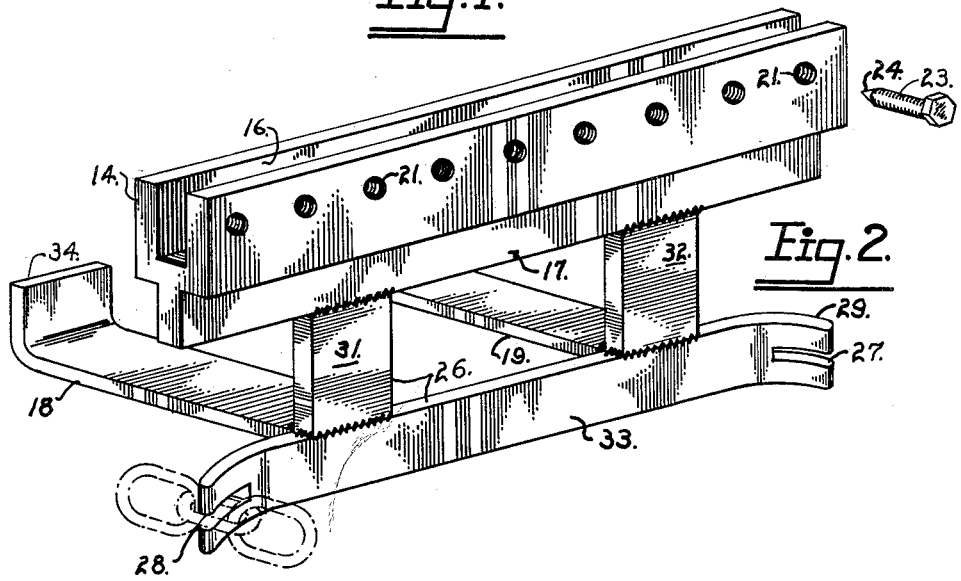
FIG. 2 is a perspective view, enlarged, of the body clamp taken in the direction of the arrow 2 of FIG. 1.

Referring more particularly to the drawings, wherein like reference characters designate like or corresponding parts throughout the different views, and referring particularly to FIG. 1, 11 designates generally an automobile body which must be straightened after a damaging impact. A body clamp, generally indicated by the number 12, is shown affixed to the automobile on a downwardly extending edge, flange, or rib, 13 thereof. Referring to FIG. 2, in which the body clamp is seen in perspective, it will be seen that said clamp comprises, (a) an elongate block 14 provided with a receiving groove, or channel 16 in the top surface thereof, (b) at least one, central pressure plate 17 extending downwardly from the underside of said block, and (c) a hook-form platform extending from said plate, which, as shown, may comprise one or more arms 18 and 19.

Figure 5:
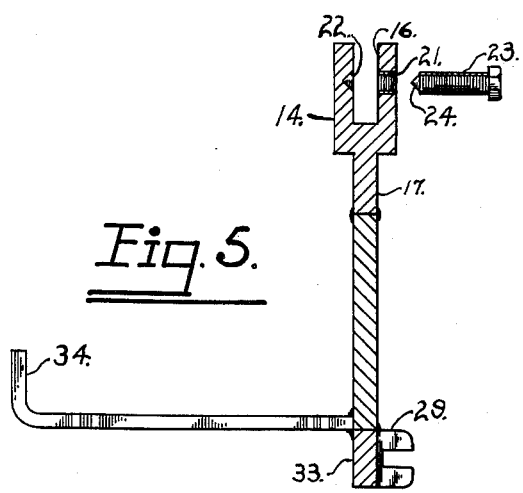
FIG. 5 is a side elevation view, in partial cross section, of the adaptor of the instant invention.

Referring to the block 14, the receiving groove 16 is adapted to receive, and be locked into engagement with the edge flange, or rib 13. The locking means, shown best in FIG. 5, comprise a series of threaded holes 21 which are provided along the length of the block and which communicate with the groove 16, said holes being aligned with corresponding recesses, or dimples 22, which are provided in the interior of the groove, whereby when a screw, such as 23, is threaded into one of said holes and seated snugly in an aligned recess, the edge 13, or any sheet of material extending into the groove, will be held securely in place as the tips 24 of the screws "bite" into the edge, and deform it into the dimple.

The pressure plate 17 in the simplest form extends downwardly from the center of the bottom of block 14 and is rigidly affixed thereto; however, for the uses and purposes specified hereinafter, it is preferred that the pressure plate be provided, as shown, with a central opening 26 and a suitable provision whereby a pulling force may be applied to the plate, such as slots 27 and 28 for receiving chains, which are shown in outline in FIG. 2. The end areas 29 in which the slots are located may be curved to provide reinforcement to the area adjacent the slots. The equivalent of the plate having the opening 26 may also be formed by two spaced-apart, downwardly extending members 31 and 32 which are affixed at the tops thereof to the block 14 and at the bottoms thereof to a cross bar 33.

Figure 3:
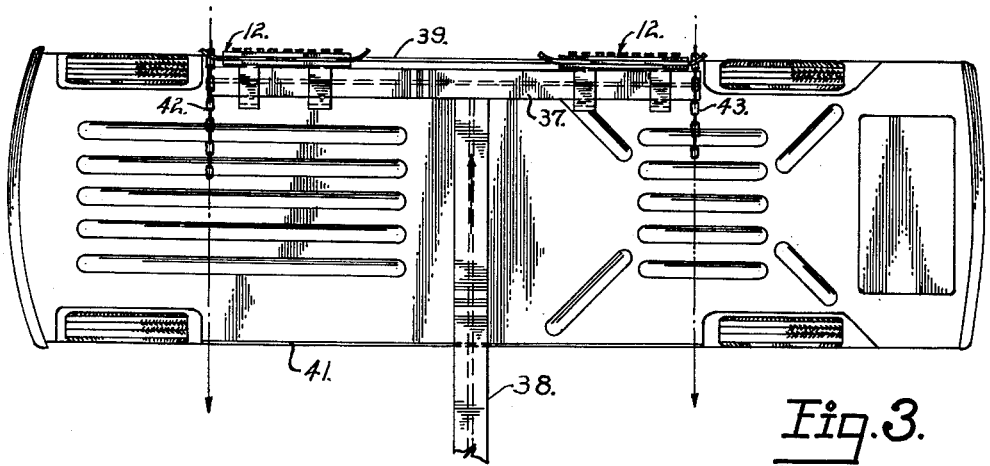
FIG. 3 is a bottom plan view of an automobile illustrating a use of the instant invention.

The platform extends outwardly from the plate and, as shown, may be formed by a series of arms such as 18 and 19 with upwardly turned distal ends 34 whereby there is provided a surface to support a beam 37 as shown in FIG. 3.

In use, two body clamps, in combination with standard tools found in automobile repair garages, are used to repair damaged automobile bodies having a unit welded body which requires stretching (a) along a side to side line, or (b) along a forward to rearward line. For this to be done, it is necessary to push or pull one side relative to an opposing side and thus it is that one side must be anchored relative to the opposing side so that the opposing side may be restored to its normal shape. The body clamps 12, in combination with the aforesaid standard tools, provide the required anchoring means.

Considering first (a) an automobile body which must be stretched along a side to side line, and referring to FIG. 3 in which this is illustrated, two body clamps 12 are fastened to the edge 13 at two points on the same side of the car in the manner described hereinbefore with reference to FIG. 1. The beam 37 is positioned on the platform provided by the arms 18 and 19 in abutting engagement with the pressure plate 17, and a push bar 38 extending laterally across the car is positioned in abutting engagement with the beam 37, whereby when a compressive force is applied to the push bar forces will be exerted along the length of the beam 37, maintaining the side 39 of the automobile body in fixed, spaced-apart relation with the side 41, which can be pulled away from the side 39. Means are provided to resist any tendency of the clamps 12 to be forced outwardly and upwardly relative to the side 39 because of any twisting movement caused by a compressive force applied to the push bar 38. The means shown in this embodiment of the invention are chains 42 and 43 which are fitted into the slots 27 and 28 and through which a tension force can be applied.

Figure 4:
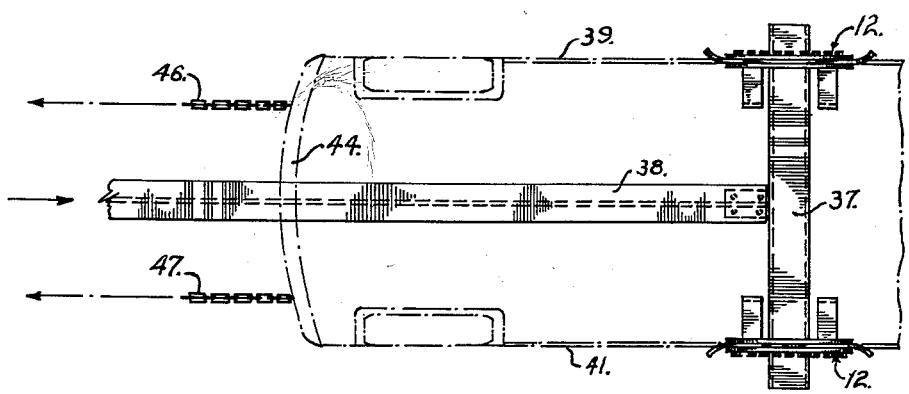
FIG. 4 is a partial bottom plan view of the instant invention illustrating another use of the instant invention showing the vehicle in phantom.

Next considering (b) an automobile body which must be stretched along a forward to rearward line, and referring to FIG. 4 in which this is illustrated, a body clamp 12 is fastened to the edge 13 on each side of the automobile body in laterally opposed relation in the manner described hereinbefore with reference to FIG. 1. The beam 37 is inserted through the central opening 26 of each body clamp, and the push bar 38, disposed as shown in FIG. 4, is positioned in abutting engagement with the beam 37, whereby when a compressive force is applied to the push bar forces will be applied along a forward to rearward line on each side of the automobile along the length of the edge 13 locked in the groove 16, so that the front or rear of the automobile body, designated 44 in FIG. 4, may be pulled relative thereto restoring the body to its normal shape. The pulling means may be of any suitable type, such as the chains 46 and 47.

It is apparent that the push bar 38 may be applied to the beam 37 at any point along its length. For instance, if the side 39 in FIG. 4 were damaged but the side 41 did not require stretching, the push bar 38 would be applied to the beam 37 adjacent the side 39 and the only pulling force would be applied along the line of the chain designated 46. The same principle also applies in using the instant invention on bodies which must be stretched on a side to side line, as is illustrated in FIG. 3.

While the instant invention has been shown and described in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalent apparatus and articles.

What is claimed is:

1. A reaction member for use in the straightening of vehicle bodies, comprising a unitary structure clamping head and beam-holding platform, said head comprising an elongate element having a channel throughout its length, in its upper face, and said platform being of generally hook-form, upwardly concave, and comprising a plate-like wall element depending from said head, a floor section extending perpendicularly from said wall element, and an upwardly turned section at the outer end of said floor section.

2. A device as in claim 1, said wall element having a central aperture of substantial size, with width comparable to that of said floor section, and said upwardly turned section having a medial slot registering with said aperture.

3. A device as in claim 2, said floor section comprising a pair of plates on opposite sides of said aperture.

4. A device as in claim 1, said wall element having a pair of ears at opposite ends of its lower portion, below said floor section, said ears having end slots to receive links of chains in anchored relation.

5. A device as in claim 1, said head having a series of threaded openings in one wall of said channel, and a series of depressions in the other wall, registering axially with said threaded openings.

References Cited in the file of this patent

UNITED STATES PATENTS

| | | |
|---|---|---|
| 2,274,881 | Bolston | Mar. 3, 1942 |
| 2,855,972 | Greider | Oct. 14, 1958 |
| 2,858,872 | Hougen | Nov. 4, 1958 |